United States Patent [19]
Hollis

[11] 3,727,222
[45] Apr. 10, 1973

[54] PSEUDO-RANDOM CODED DOPPLER TRACKING AND RANGING

[76] Inventor: Walter C. Hollis, 19 Biltmore Boulevard, Massapequa, N.Y. 11758

[22] Filed: Nov. 17, 1970

[21] Appl. No.: 90,276

[52] U.S. Cl. ............343/7.5, 343/13 R, 343/17.1 PF
[51] Int. Cl. ..................................................G01s 9/10
[58] Field of Search.................343/17.1 PF, 17.1 R, 343/13 R, 7.5; 356/5

[56] References Cited

UNITED STATES PATENTS

| | | | |
|---|---|---|---|
| 2,981,942 | 4/1961 | Gross | 343/13 R |
| 3,469,261 | 9/1969 | Lambert, Jr. et al | 343/17.1 PF |

Primary Examiner—Benjamin A. Borchelt
Assistant Examiner—G. E. Montone
Attorney—Mason, Mason & Albright

[57] ABSTRACT

A gated continuous wave system is described in which the transmitter and receiver are gated alternately to transmit and receive signals. The gating of the transmitter and receiver is controlled by a code generator which cyclically produces pseudo-random sequences of gating pulses for both the receiver and transmitter. By this means, the reflected transmitted signal will always be sensed by the receiver provided that the delay does not exceed the period of each sequence of pseudo-random gating pulses.

11 Claims, 14 Drawing Figures

INVENTOR
WALTER C. HOLLIS
BY
Mason, Mason & Albright
ATTORNEYS

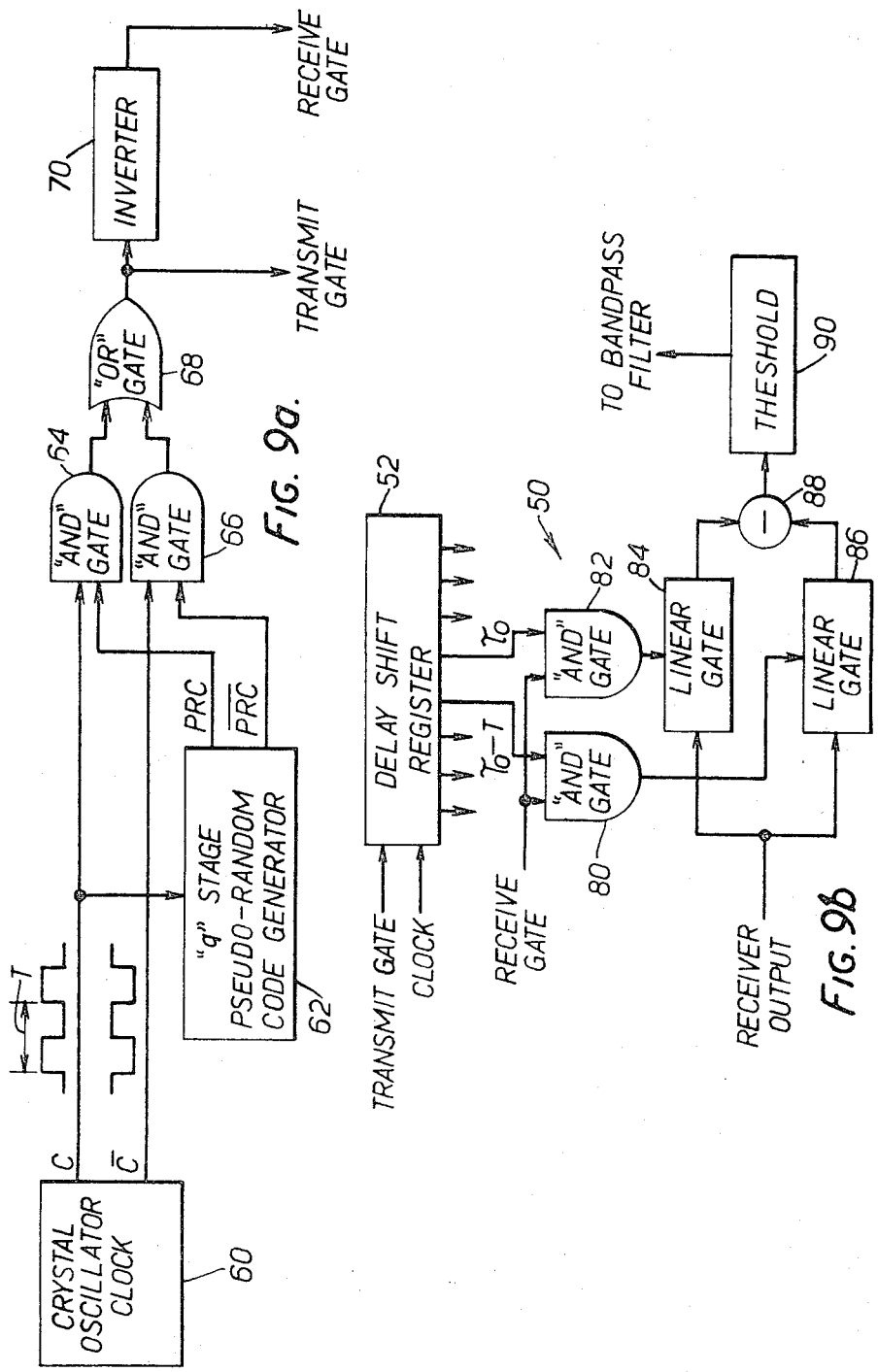

PSEUDO-RANDOM CODED DOPPLER TRACKING AND RANGING

BACKGROUND OF THE INVENTION

1. Field of the invention

The present invention relates to monitoring systems employing radio waves such as ranging and tracking systems, for example.

2. Description of the prior art

FIG. 1 shows a block diagram of a known gated doppler radar system in which a transmitter 12 and a receiver 14 are successively connected to a common antenna 16 in response to operation of respective diode 18 and 20. The diode switches 18 and 20 are successively triggered by a square wave generator 22. The transmitter 12 comprises a crystal exciter whose output signal (at frequency $f_o$), after passing through the diode switch 18, is amplified by a power amplifier 24 before being fed to the antenna 16. The receiver 14 receives a reference signal from the transmitter 12 and feeds its output signal to a low pass filter 26 which in turn provides an output signal having a doppler frequency.

FIG. 2 shows the various waveforms of the circuit of FIG. 1. The waveforms 1 and 2 respectively show the signals transmitted and received by the antenna 16 (the received waveform being produced by reflection of the transmitted wave from a distant object or target). The waveform 3 shows the waveform actually received by the receiver 14. The waveforms 4 and 5 are respectively the output waveforms from the receiver 14 and from the low pass filter 26.

As will be seen, the waveform 1 comprises pulses each having a burst of signals of frequency $f_o$. The pulse repetition rate is $f_g$, and the delay between the start of successive pulses is $1/f_g$. When the transmitted pulses return to the antenna as a result of reflection from the target they will lag behind the transmitted pulses by a time $t_d$. The time $t_d$ is given by $$t_d = 2R/C$$

where R is the distance travelled by the transmitted signal (the target range) and C is the velocity of propagation. If the target is moving, the frequency of the signal in the transmitted pulse will have been changed upon reflection at the target to $f_o \pm f_d$ where $$f_d = 2V/C \times f_o$$

and V is the speed of target towards or away from the antenna 16. The waveform 5 in FIG. 2 shows the frequency $f_d$ which is produced by filtering the output signal (waveform 4) from the receiver.

From waveforms 1, 2 and 3, it will be apparent that the doppler radar system suffers from the disadvantage that it will not respond when the target distance is such that the received energy pulses, reflected from the target, arrive back at the antenna during the instants when the transmitter is ON and the receiver is OFF. Accordingly, the system will not, in such a case, detect the presence of the target, nor, of course, its range or velocity. The problem is explained in FIG. 3 waveforms 3A and 3B of which show periods for which the transmitter and receiver respectively, are gated ON. Waveform 3 shows the relative sensitivity of the system plotted against time delay (equivalent to range). If the range of the target is zero, then the received signal will arrive while the transmitter is ON and the receiver is OFF, so the sensitivity is zero. As the range increases, the sensitivity will increase and reach a maximum when the range is equivalent in time delay to the ON time of the transmitter thus the received signal will be wholly received within the ON time of the receiver. Further increase of range reduces sensitivity, since the received signal now begins to coincide with the next ON time of the transmitter. Therefore, a triangular response is produced and the range of the system must be severely limited to avoid the nulls in the response.

A continuous wave radar system does not suffer from the above disadvantages. However, a continuous wave system is less satisfactory than a pulse system at high powers when interference between the transmitted and received signals may be difficult to avoid.

An object of the invention therefore, is to provide a radar system which minimizes the disadvantages of the prior art system.

SUMMARY OF THE INVENTION

The present invention provides a data transmitting and receiving system, comprising data transmitting means operative when activated to transmit a signal, data receiving means operative when activated to receive a signal derived from the transmitted signal, and control means operatively connected to activate the transmitting and receiving means, the control means being operative to activate the transmitting means for each ON period of a sequence of ON and OFF periods, the relative lengths of the periods being such that each part of the sequence is measured from the beginning of the sequence differs from the next following part of equal length, the control means being operative to activate the receiving means during each said OFF period.

BRIEF DESCRIPTION OF THE DRAWINGS

Radar systems embodying the invention will now be described, by way of example only, with reference to the accompanying diagrammatic drawings in which:

FIG. 1 is a block diagram of the prior art gated doppler radar system already referred to;

FIG. 8 shows an autocorrelation function;

FIG. 9A is a block circuit diagram showing part of a system of FIG. 5 in more detail;

FIG. 9B is a block circuit diagram showing another part of a system of FIG. 5 in more detail;

DESCRIPTION OF THE PREFERRED EMBODIMENTS

Figure 4:
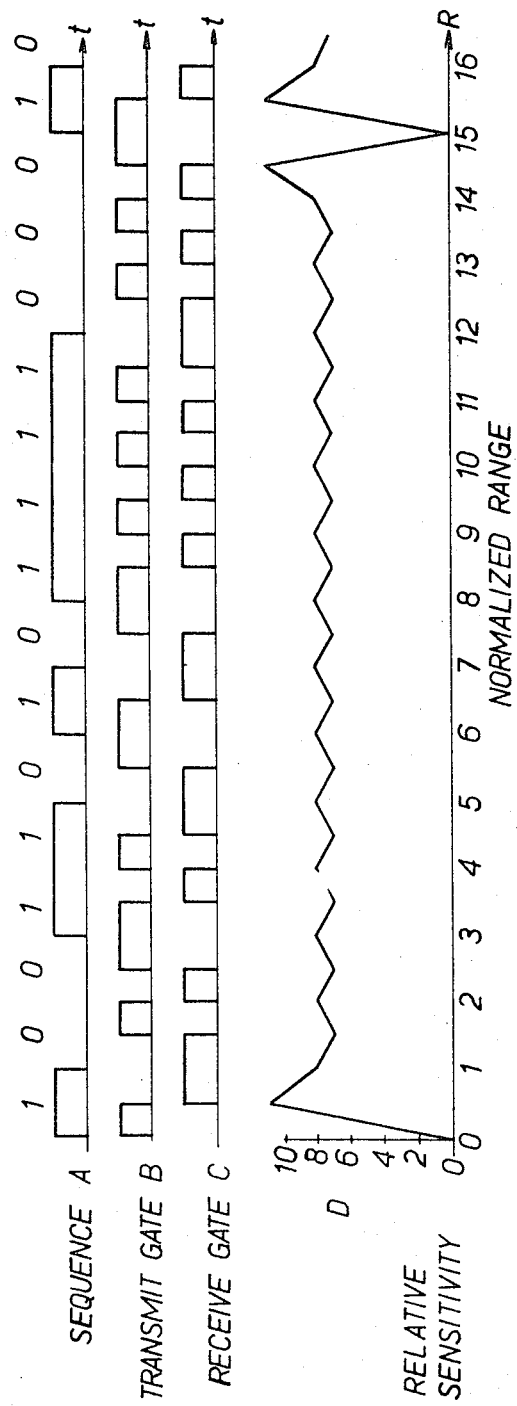
FIG. 4 shows the graphical derivation from gating pulses of the relative sensitivity of a radar system embodying the invention.

The operating principle of a system embodying the invention is shown in FIG. 4. As shown in waveform 4A a 15 bit sequence of 1s and 0s is set up (by means to be described). This is a pseudo-random sequence (maximum length sequence), that is the order of bits in any group of successive bits in its measured from the beginning of the sequence differs from the order of the next group of the same length. In other words the sequential order of the bits does not repeat itself until the sequence of the 15 bits has been completed.

The sequence of bits is used to control the transmit and receive gates of a doppler radar system such that the transmit gate is ON for the first half of each 1, bit and the second half of each 0 bit, and such that the receive gate is ON when the transmit gate is OFF; in other words, the ON times of the transmit and receive gates follow a pseudo-random sequence which repeats after 15 bits. Waveforms 4B and 4C show the ON times of the transmit and receive gates.

Figure 1:
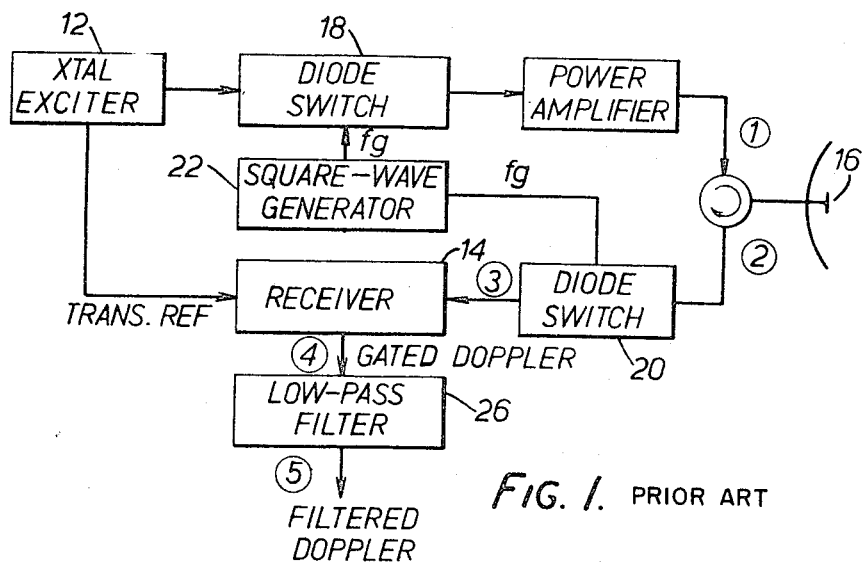
Figure 2:
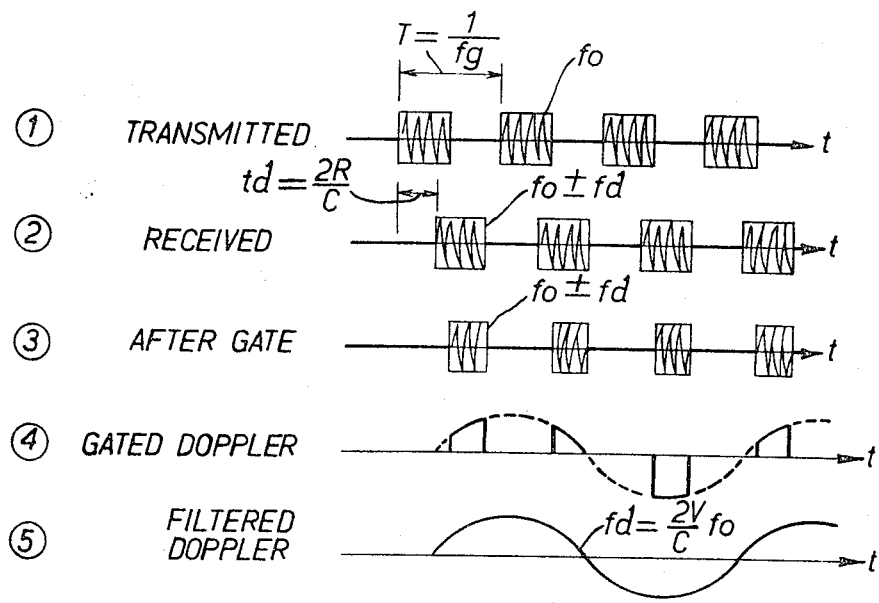
FIG. 2 illustrates the signal waveforms already referred to at various points in the block diagram of FIG. 1.
Figure 3:
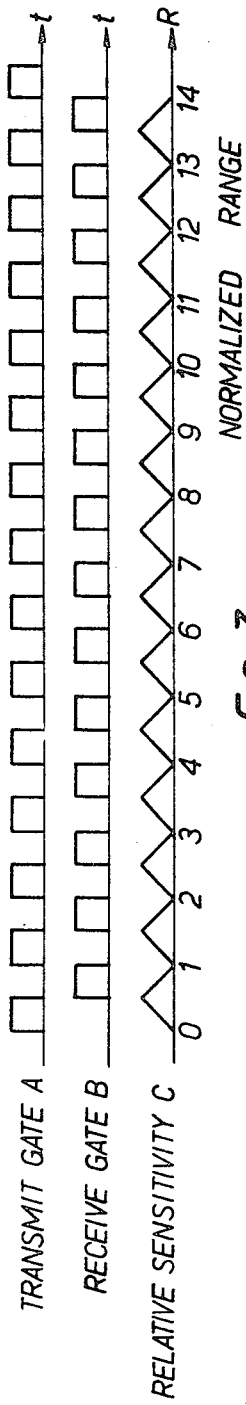
FIG. 3, already referred to, shows the graphical derivation from gating pulses of the relative sensitivity of the radar system of FIG. 1.

As in the case of the prior art system, the system embodying the invention causes radio waves to be transmitted each time the transmit gate is ON and these waves are reflected by the target and received when the receive gate is ON. Waveform 4D shows the relative sensitivity of the system as a function of target range (equivalent to time). It will be seen that because of the pseudo-random operation of the transmit and receive gates, the sensitivity remains high during the whole of the 15 bit period and only falls to zero at the end of this period. This is because, for any range less than the range equivalent to the fifteen bit period, the energy transmitted during at least some of the transmit gate ON times will be received during receive gate ON times. In other words, the system embodying the invention has a sensitivity which is high for target ranges up to a range equivalent to the 15 bit period and only falls to zero (thereafter rising to a high value for the next fifteen bit period). This enables the system to have a very much longer effective range than the system whose operation is explained in FIG. 3 and this range can be altered (increased or decreased) by altering the length of each pseudo-random bit sequence. A system embodying the invention will now be described in more detail, with initial reference to FIG. 5.

Figure 5:
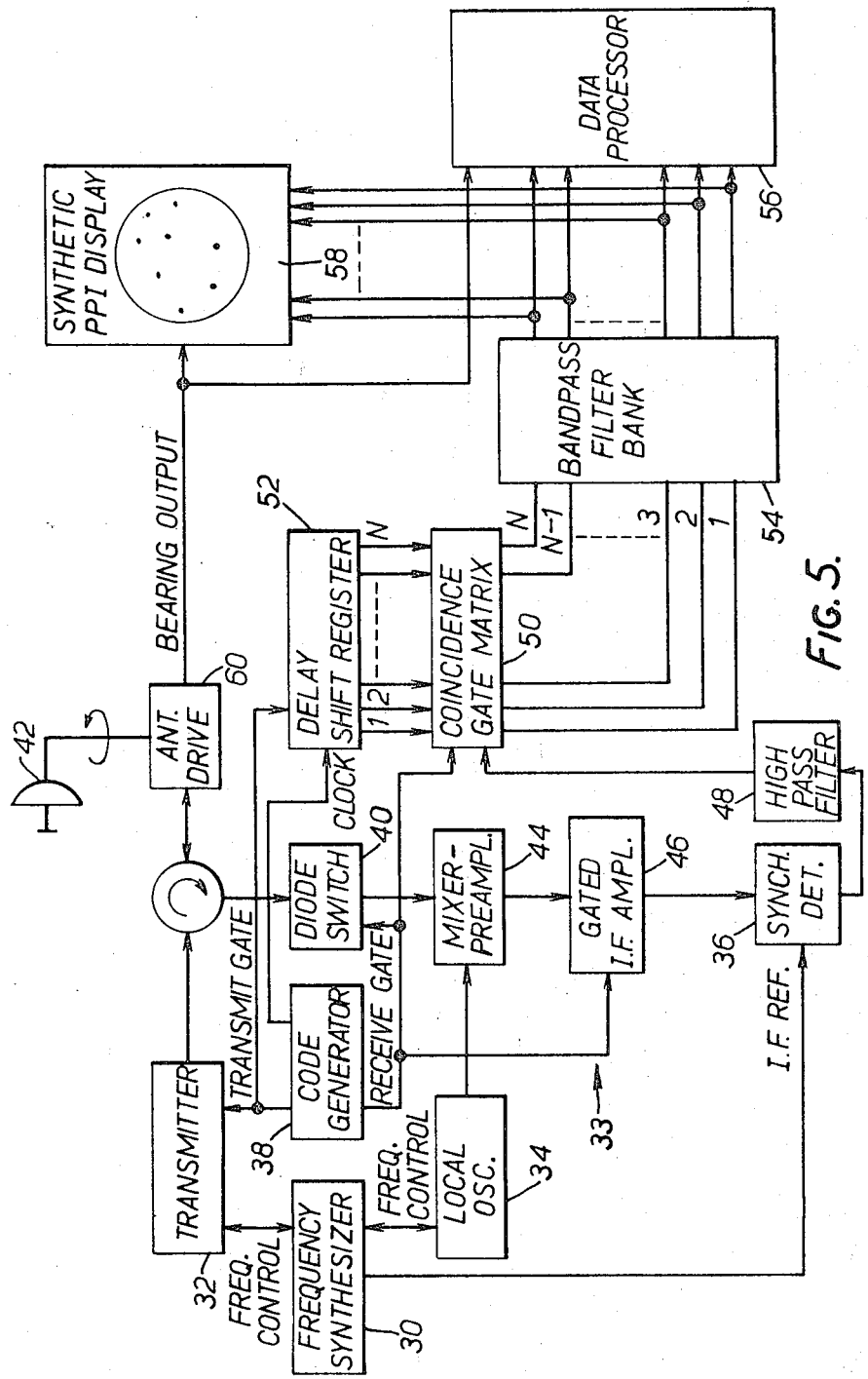
FIG. 5 is a block diagram of a radar search system embodying the invention.

As shown in FIG. 5, a frequency synthesizer 30 controls a transmitter 32 and a local oscillator 34 and provides an intermediate frequency reference signal for a synchronous detector 36. A code generator 38 generates coded transmitter and receiver gating signals shown in FIG. 4B and 4C which respectively gate the transmitter 32 and the receiver 33, the latter being gated by a diode switch 40. The gating signals are such as to successively connect the transmitter 32 and the receiver 33 (through the diode switch 40) to an antenna 42. The receiver 33 includes a mixer-preamplifier 44, which receives signals from the local oscillator 34 and the diode switch 40, and a gated intermediate frequency amplifier 46 which receives signals from the code generator 38 and the mixer preamplifier 46. The output signal from the amplifier 46 is fed through the synchronous detector 36 to a high pass filter 48. The output signal from the high pass filter 48 is a composite signal containing velocity and range information on all targets within the antenna beam width. The composite signal is fed to a coincidence gate matrix 50 which is triggered by receiver gating signals from the code generator and control pulses from a delayed shift register 52. The delay shift register 52 is controlled by transmitter gating pulses and clock pulses derived from the code generator 38.

The output of the coincidence gate matrix 50 is fed in parallel to a data processor 56 and a plan position indicator (PPI) display unit 58, by a band pass filter bank 54. The PPI display unit 58 and the data processor 56 are both supplied with antenna bearing information from an antenna drive unit 60.

FIG. 9A shows a block diagram of a code generator 38 for controlling the transmit and receive gates. A crystal oscillator clock 60 generates two square wave waveforms, C, and its complement $\overline{C}$. The period of each waveform is T, (this also being the length of each 1 or 0 period of the pseudo-random sequence of FIG. 4A). The clock 60 drives an g stage pseudo-random code generator 62 which generates a pseudo-random code PRC (as shown in FIG. 4A), and its complement $\overline{PRC}$. The four waveforms C, $\overline{C}$, PRC and $\overline{PRC}$ are combined in two AND gates 64 and 66 and an OR gate 68 in accordance with the logic statement $C \cdot PRC + \overline{C} \cdot \overline{PRC}$ to provide the transmit gate waveform (FIG. 4B). The transmit waveform is inverted by an inverter 70 to obtain the complementary receive gate waveform (4C).

FIG. 9B shows the coincidence gate matrix 50 of FIG. 5 in more detail. The transmit gate pulses are fed into the delay register 52 which is driven by clock pulses derived from the code generator 38. The delay register has an output at each of its stages. Each output of the delay register 52 is connected to one input of a corresponding AND gate (FIG. 9b only shows two such AND gates, reference 80 and 82, connected to two adjacent outputs of the delay register 52). The other inputs of all these AND gates are connected to be triggered by the receive gate pulses. The AND gates of each pair corresponding to an adjacent pair of shift register outputs control a pair of linear gates; FIG. 9B only shows two such linear gates 84 and 86. The linear gates of each pair are respectively arranged to feed the receive output signal to the two inputs of a corresponding difference circuit (FIG. 9B only shows one difference circuit 88). The output of each difference circuit is fed through a corresponding threshold device (only one device 90 being shown) to the band pass filter 54).

In operation, the transmitter 32 (FIG. 5) is gated by the code generator 38 to pass transmit signals to the antenna 42. The antenna radiates the transmit signals in the direction of a target and receives the signals when they are reflected back by the target. The received signals are again gated by the code generator 38 through the diode switch 40 in the manner explained with reference to FIG. 4 and fed to the receiver 33. As explained in conjunction with FIG. 4, the system of FIG. 5, by employing the pseudo-random code generator 38 to control the transmit and receive gates, considerably increases the effective range of the system. In addition, however, the system of FIG. 5 enables an advantageous method of assessing target range as will now be described.

When the transmitted signal is received by the receiver 33 it will be modified by the receiver gating process. On average, one half of the received energy is gated out and the resultant waveform consists of varying width pulses which may vary in length from 0 (gated out entirely) to T (the gate period). The result is a waveform which is a function of the delay and hence it has upper and lower side band frequencies which vary with delay.

The delay shift register 52 and the coincidence gate matrix 50 simulate received waveforms for a plurality of discrete values of delay, as will be hereinafter described, and the actual received waveform is compared with these simulated waveforms to enable the approximate delay value (corresponding to target range) of the actual received waveform to be established.

The operation of the delay shift register 52 and the coincidence gate matrix 50 will now be described. The transmit gate wave form (FIG. 4B) is clocked through the register 52. The register 52 has N stages and the output of each stage therefore carries a replica of the transmit gate waveform, each such replica being delayed by T (the gate period) relative to the replica of the preceding stage. Each replica is then gated by the receive gate waveform (4C) in the respective one of the AND gates corresponding to AND gates 80 and 82. The output of each AND gate consequently simulates the received waveform (without carrier), for discrete delay values of $T, 2T, 3T \ldots (n-1)T, nI \ldots NT$, where $n$ is an integer.

Thus it will be seen that, in general, the two waveforms respectively representative of the delay values of $(n-1)T$ and $nT$ together define a known increment of range. The actual received waveform is then compared in respective pairs of linear gates (corresponding to gates 84, 86) with each pair of waveforms representative of consecutive delay values $(n-1)T$ and $nT$. When the range represented by the actual received waveform falls into the range increment represented by the delay values $(n-1)T$ and $nT$ the difference in output between the corresponding pair of linear gates will be a maximum. This maximum is detected by the corresponding threshold circuit and passed to the band pass filter bank 54.

The foregoing is explained mathematically with reference to FIG. 8 which shows a function $R(\tau,\tau_o)$ of the actual and simulated received waveforms delay values ($\tau$ and $\tau_o$) plotted against the simulated received waveform delay value $R(\tau,\tau_o)$ is given by $$R(\tau, \tau_o) = 2 \lim \frac{1}{T_o} \int_0^{T_o} G(t) \cdot [1 - G(t-\tau)] [G(t)][1-G(t-\tau_o)] \cdot dt\, T_o \to \alpha$$

where $G(t)$ is the receiver gating binary waveform, $1 - G(t-\tau)$ is the delayed transmitted binary waveform, and $T_o$ is the integration time.

It will be seen from FIG. 8 that the function $R(\tau,\tau_o)$ is constant with increasing simulated delay $\tau_o$ except at the initiation and termination of each set of pseudo-random received gating pulses and at a delay $\tau_o$ corresponding to the target. At the beginning of each set of pulses, the function $R(\tau,\tau_o)$ rises from zero to $\frac{3}{8}(1 \pm 2/M)$ and thereafter settles down to a substantially constant value of 0.25. As the delay $\tau_o$ approaches $\tau - T$, the function $R(\tau,\tau_o)$ falls to $\frac{1}{8}(1 \pm 2/M)$ and then rises at $\tau_o = \tau$ to a value of $\frac{1}{2}(1 \pm 1/M)$. Thereafter the value of $R(\tau,\tau_o)$ falls again to $\frac{1}{8}(1 \pm 2/M)$ and rises at delay $\tau_o = \tau + T$ to the substantially constant value of 0.25. Finally as $\tau_o$ approaches $MT$, the function $R(\tau,\tau_o)$ rises to $\frac{3}{8}(1 \pm 2/M)$ again and falls to zero when $\tau_o$ equals $MT$. It will be seen that this function, which may be called an auto correlation function, enables unambiguous ranging of the target.

The relative sensitivity waveform (shown in FIG. 4D), which has been determined by combining the waveforms 4B delayed and 4C as hereinbefore described is expressed mathematically as follows:

$$S(\tau) = 2 \lim \frac{1}{T_o} \int_0^{T_o} [G(t)][1-G(t-\tau)]dt - 2T_o \to \alpha$$

where $s(\tau)$ is the relative sensitivity (fraction of total energy received after receiver gating) and the other items are as previously defined.

Figure 6:
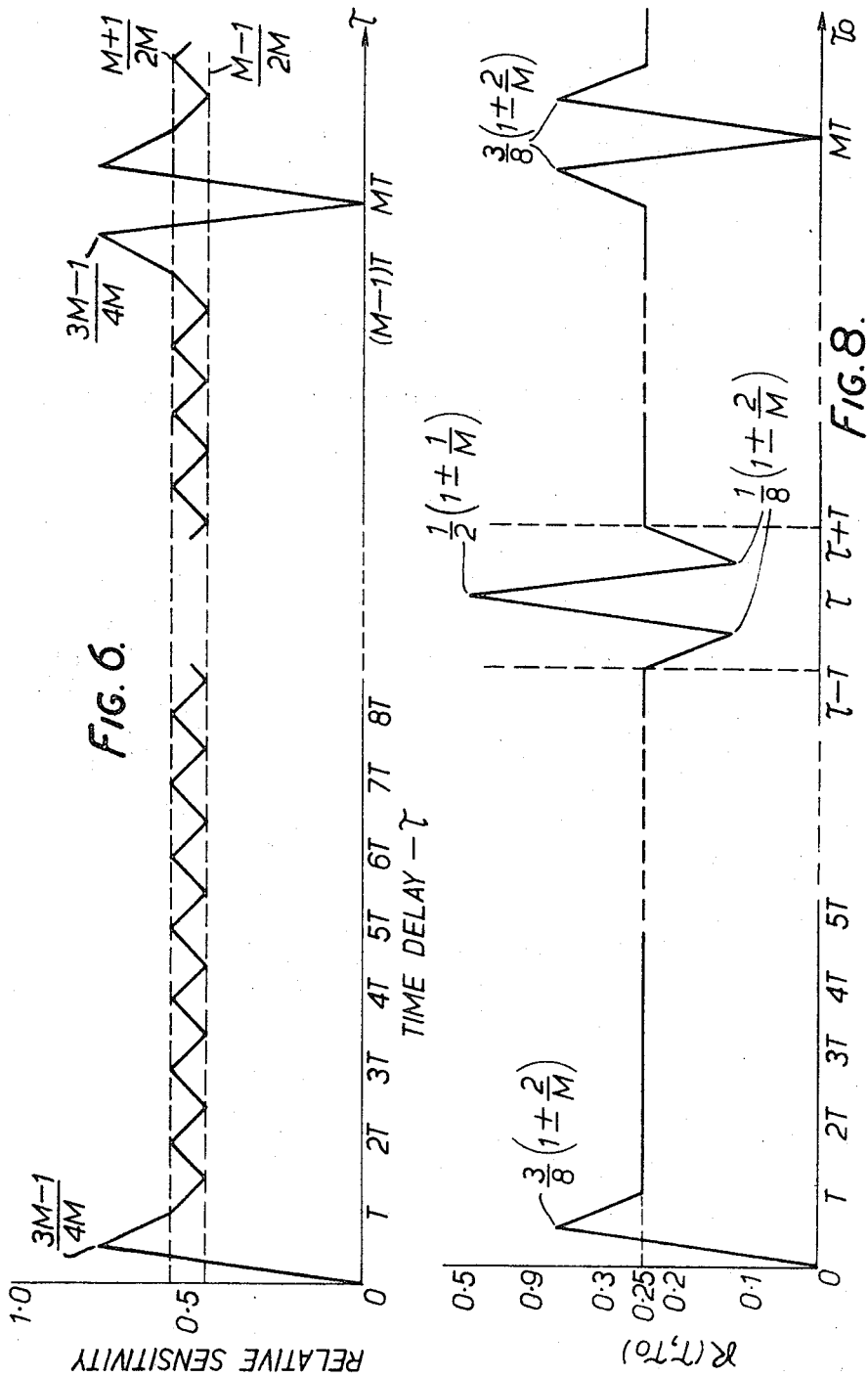
FIG. 6 shows a generalized waveform of relative sensitivity plotted against range in the systems embodying the invention.

FIG. 6 illustrates the general characteristics of relative sensitivity plotted against time according to the above mathematical expression.

It will be seen that the relative sensitivity rapidly increases with range from zero when the range is zero to $(3M-1/4M)$ (which approximately equals 0.75) when the range equals $T/2$. Thereafter with increasing range, the sensitivity oscillates between $(M+1/2M)$ and $(M-1/2M)$ (this representing approximately a sensitivity of 0.5), and then falls to zero when the range is $MT$ or multiples of $MT$.

It will be seen that M is large, the difference between $(M+1/2M)$ and $(M-1/2M)$ will be reduced so that for the greater part of the characteristic variations in sensitivity are negligible.

The transmitted waveform will be in the form of a carrier wave which is gated by the waveform of FIG. 4b, that is, it will be in the form of a carrier wave with upper and lower side bands. Since the carrier wave is transmitted by the transmitter for an average of 50 percent of any given period it will be appreciated that half the power transmitted by the transmitter lies in the carrier and the other half of power is spread within the upper and lower side bands. The amplitude $An$ of each harmonic is mathematically expressed as follows:

$$A_n = A(1/2M) \cdot [\sin(\pi n/2M)/(\pi n/2M)] S(M,n) \quad (3)$$

where $An$ is the amplitude of the $n$th harmonic, $A$ is the amplitude of the coded binary waveform and $S(M,n)$ is a weighting function.

A computer routine can be used to determine the weighting function $S(M,n)$. A computer routine based on the code lengths of $M = 15$ and $M = 63$ determines that the weighting function is given by $S(M,n) = 2^{(q/2)} \sin \pi n/2M$ where $M = 2^q -1$. This equation was found to hold good for all values of n except where $n$ equals $2rM$ (where $r$ equals $0, \pm 1, \pm 2, \ldots$) at which the value of the weighting function was $M$, and where $n = (1+2R)M$ at which the value of the weighting function was 1.

Thus, substituting for $S(M,n)$ in Equation 3.

$$An = A(2^{(q/2)}/2M) \cdot [(\sin \pi n/2M)/(\pi n/2M)] \quad (4)$$

Figure 7:
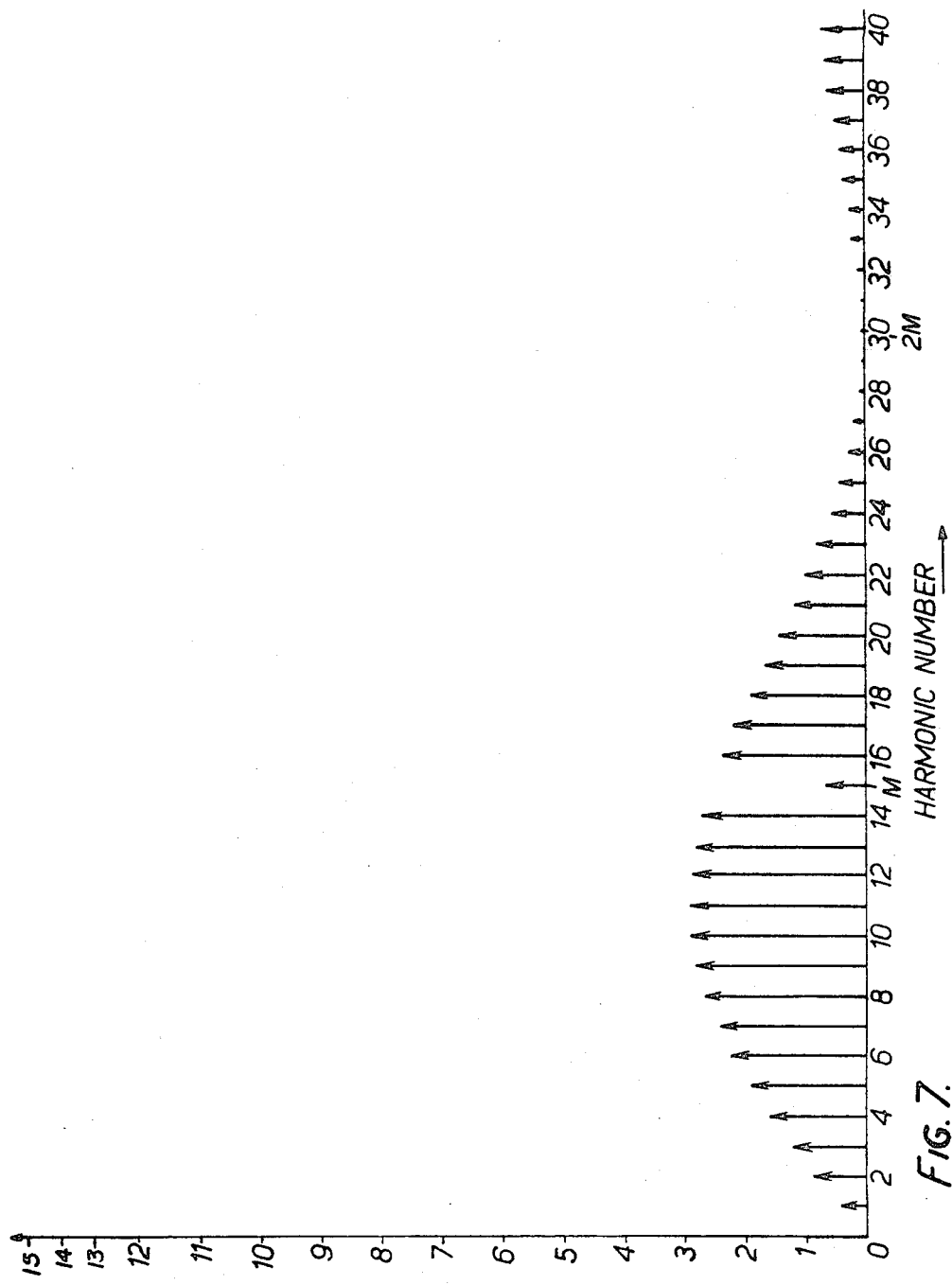
FIG. 7 shows the carrier and upper side band of the spectrum of the signal transmitted by the radar system of FIG. 5.

Equation 4 applies if $n \neq 0$ or $(1+2)M$. If $n=0$, $A_n = A/2\pi$ If $n=(1+2r)M$, $A_n = A/\pi n$ FIG. 7 illustrates the main upper side band characteristic of the transmitted signal when $M$ equals 15.

By increasing the code length M, the amplitude of each side band frequency is decreased by approximately $1/\sqrt{M}$ (and the power is decreased by $1/M$. However the number of side band harmonics is increased proportionally. That is, increasing 9 by one approximately doubles the number of side band harmonics, decreases the spacing between the side harmonics by a factor of 2 and decreases the power in each harmonic also by a factor of 2(−3db.).

In general it has been found that one quarter of the power of the received signal (after gating) lies in the carrier wave and three quarters of the power is spread among all the side band harmonics.

Figure 10:
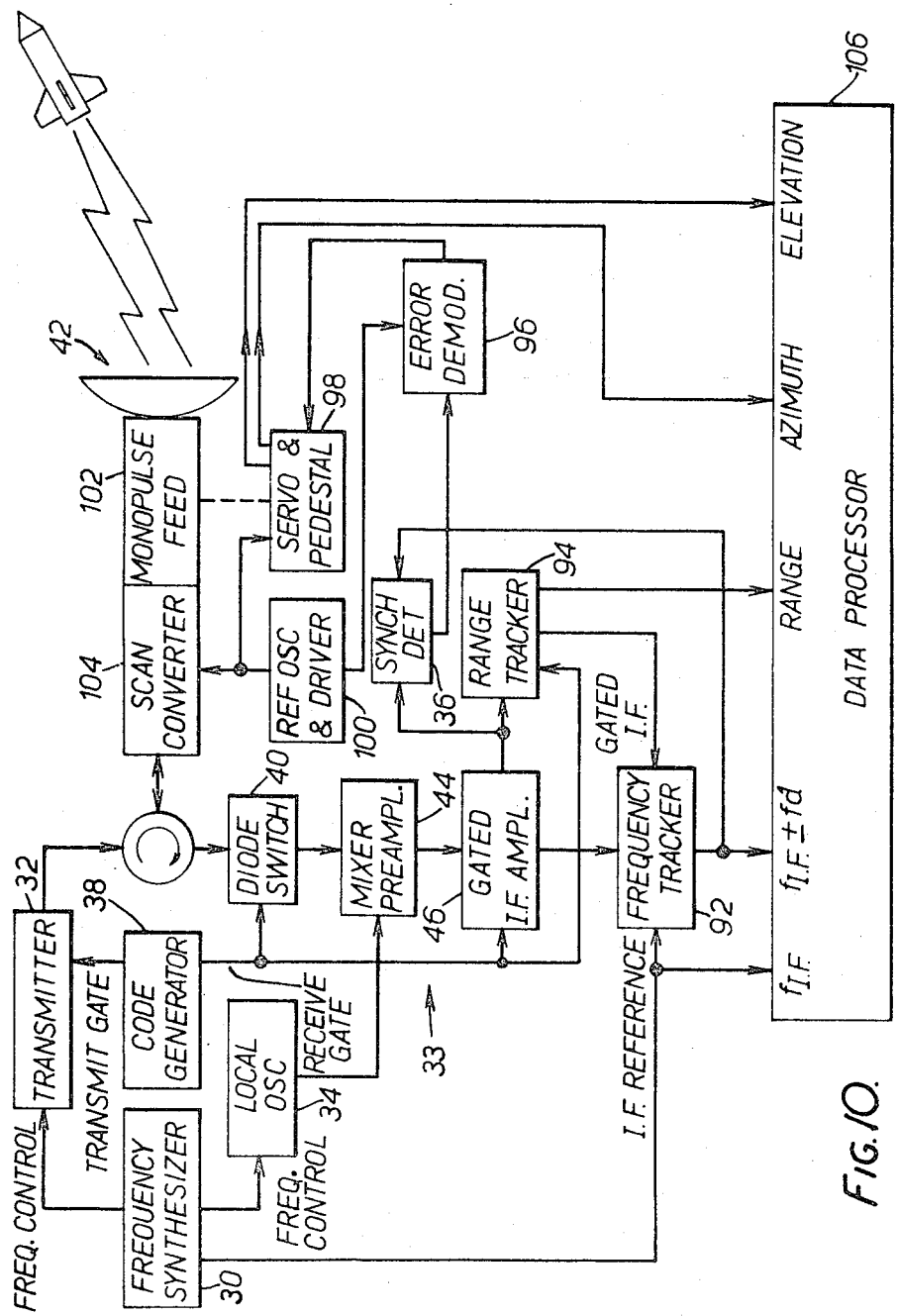
FIG. 10 is a block circuit diagram of a radar tracking system embodying the invention.

FIG. 10 shows a tracking radar system with parts similar to those in the search radar system of FIG. 5 being similarly referenced. In FIG. 10 the transmitter and receiver are gated to an antenna 42 by means of the code generator 38 in the same way as described in conjunction with FIG. 5. In FIG. 10, however, the output of the gated IF amplifier 46 if fed to a frequency tracker 92 and a range tracker 94 in addition to the synchronous detector 36. An output of the range tracker 94 is fed to the frequency tracker 92 and an output of the frequency tracker 92 is fed to the synchronous detector 36. The range tracker 94 is triggered by receive gate pulses and the frequency tracker 92 receives an intermediate frequency reference signal from the synthesizer 30.

The output of the synchronous detector 36 feeds an error demodulator 96 which in turn controls a servo driven antenna pedestal 98. The series combination of a mono-pulse feed circuit 102 and a scan converter 104 interconnects the antenna 42, the transmitter, and the receiver. A reference oscillator 100 provides reference signals for the scan converter 104, the antenna pedestal 98 and the error demodulator 96.

The outputs from the frequency synthesizer 30, the frequency tracker 92, the range tracker 94 and the antenna pedestal 98 are fed to a data processor 106.

In operation, range tracking is accomplished in the range tracker 94 which incorporates a delay lock discriminator to be described hereinafter.

Frequency tracking is achieved by the frequency tracker 92. The frequency tracker 92 selects and locks onto the carrier signal of the target return signal using a frequency or phase tracking loop such as is well known in the art. The selected carrier, which has a doppler shift resulting from the moving target, is compared with the IF reference signal and target velocity can then be determined from the resultant signal. An antenna direction error signal is generated by the mono pulse feed circuit 102 which combines azimuth and elevation signals sequentially with the received signal in a manner well known in the art and so provides an amplitude modulated signal which is proportional to the antenna pointing error. The error signal is recovered by the synchronous detector 36. The error demodulator 96 demodulates the output from the detector 36 and using the reference signal produced by the reference oscillator 100, provides separate azimuth and elevation signals which are then used to vary the antenna pedestal position.

The data processor receives information concerning the doppler velocity, the range, the azimuth angle and the elevation angle.

Figure 11:
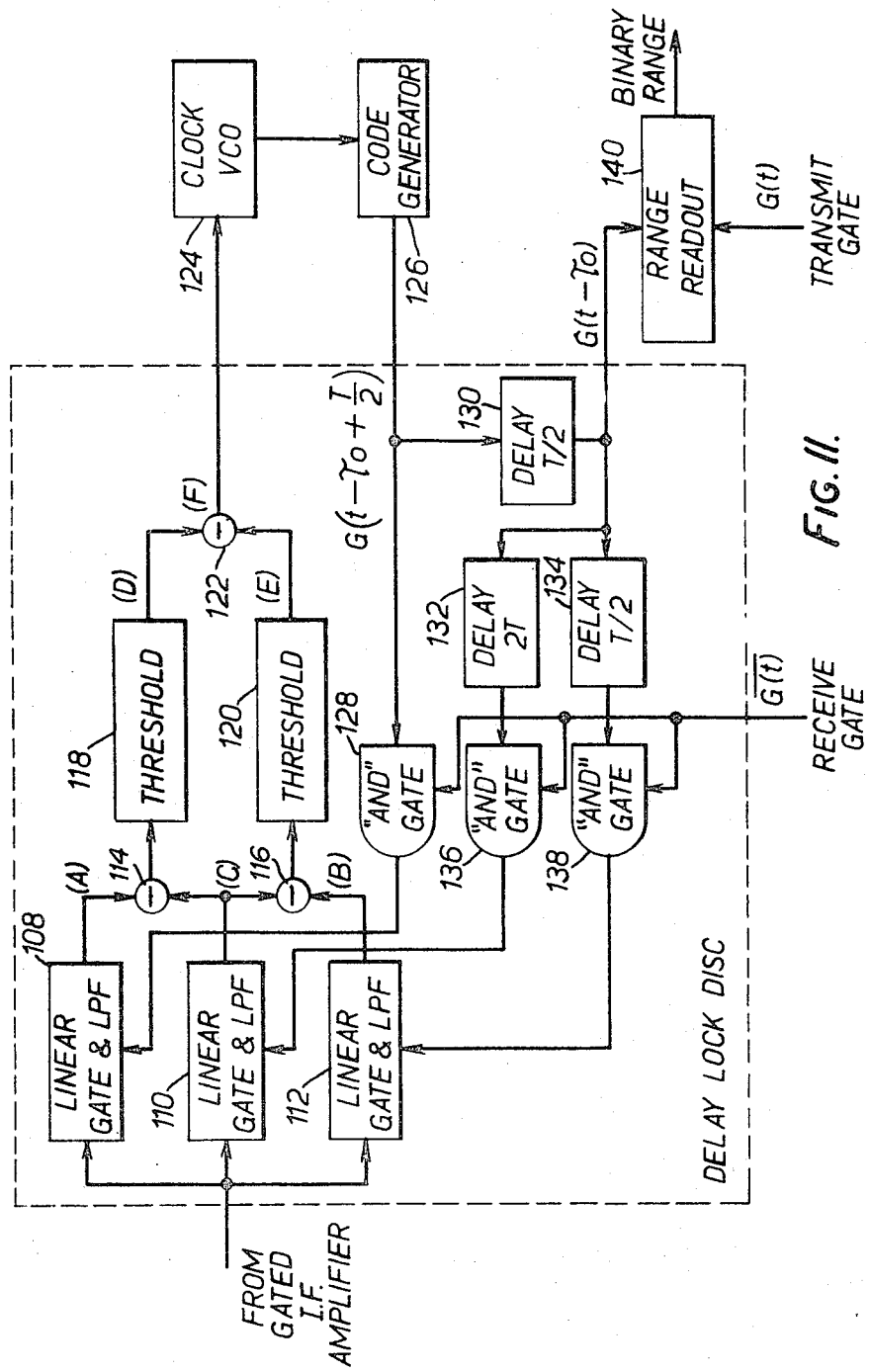
FIG. 11 is a block circuit diagram showing part of the system of FIG. 10 in more detail.
Figure 12:
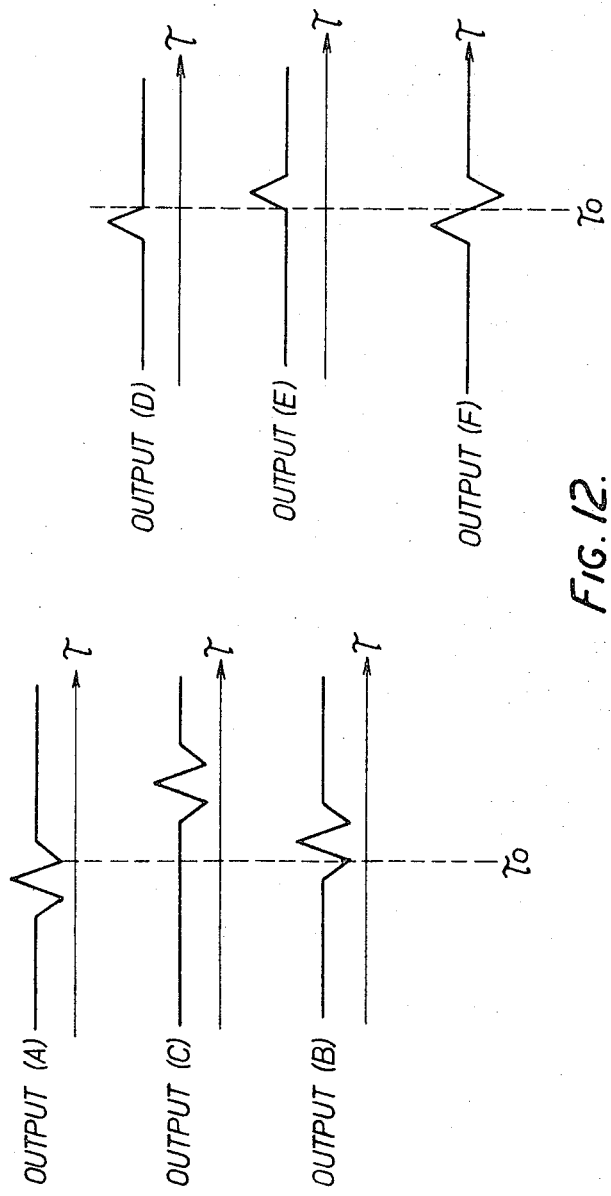
FIG. 12 shows the waveforms of the outputs of various points in the block diagram of FIG. 11.

FIG. 11 shows a block diagram of the range tracker 94 of FIG. 10. The output from the gated IF amplifier 46 is fed simultaneously to three linear gates 108, 110 and 112. The outputs of the gates 108 and 110 are compared in a difference circuit 114 and are fed to a threshold circuit 118. The outputs of the gates 110 and 112 are compared in a difference circuit 116 and fed to a threshold circuit 120. The outputs from the two threshold circuits 118 and 120 are fed to another difference circuit 122 whose output is used to control a voltage controlled clock 124. A code generator 126 similar to the code generator 38 of FIGS. 4 and 10 is triggered by the clock 124. The output of the code generator is fed simultaneously direct to one input of an AND gate 128, through delay circuits 130 and 132 to one input of an AND gate 136, through delay circuits 130 and 134 to one input of an AND gate 138, and through delay circuit 130 to a range readout circuit 140. The other inputs of the three AND gates 128, 136 and 138 are triggered by receive gate pulses. The range readout circuit 140 is connected to receive transmit gate pulses. The outputs of the three AND gates 128, 136 and 138 are connected to control the linear gates 108, 110 and 112, respectively.

In operation, the output of the receiver 33 is fed simultaneously to the three linear gates 108, 110 and 112. The linear gates 108, 110 and 112 are respectively controlled by three simulated received waveforms delayed by $O$, $T$ and $2½T$ with respect to the output of the code generator 126 through delay circuits 130, 132 and 134 and AND gates 128, 136 and 138. The outputs of the gates 108 and 112 are compared with the output of gate 110, and the difference between the comparisons determined by the difference circuit 112 and fed to the voltage controlled clock generator 124. By this means the generator 124 causes the code generator 126 to generate the function $G(t-\tau+T/2)$ so that the input fed to the range readout 140 becomes the function $G(t-\tau)$ by delaying the function $G(t-\tau+T/2)$ by a period $T/2$.

The range readout 140 thus receives two separate sets of signals, one set being the transmit gate signals $G(t)$ and the other set from the range tracker 94 being signals $G(t-\tau)$ which are identical to the transmit gate signals but delayed with respect thereto by the time $\tau$. By comparing these two signals the time $\tau$ and therefore the range can be determined in a binary coded manner.

The two threshold circuits 118 and 120 prevent negative comparisons from being passed to the difference circuit 122.

Figure 13:
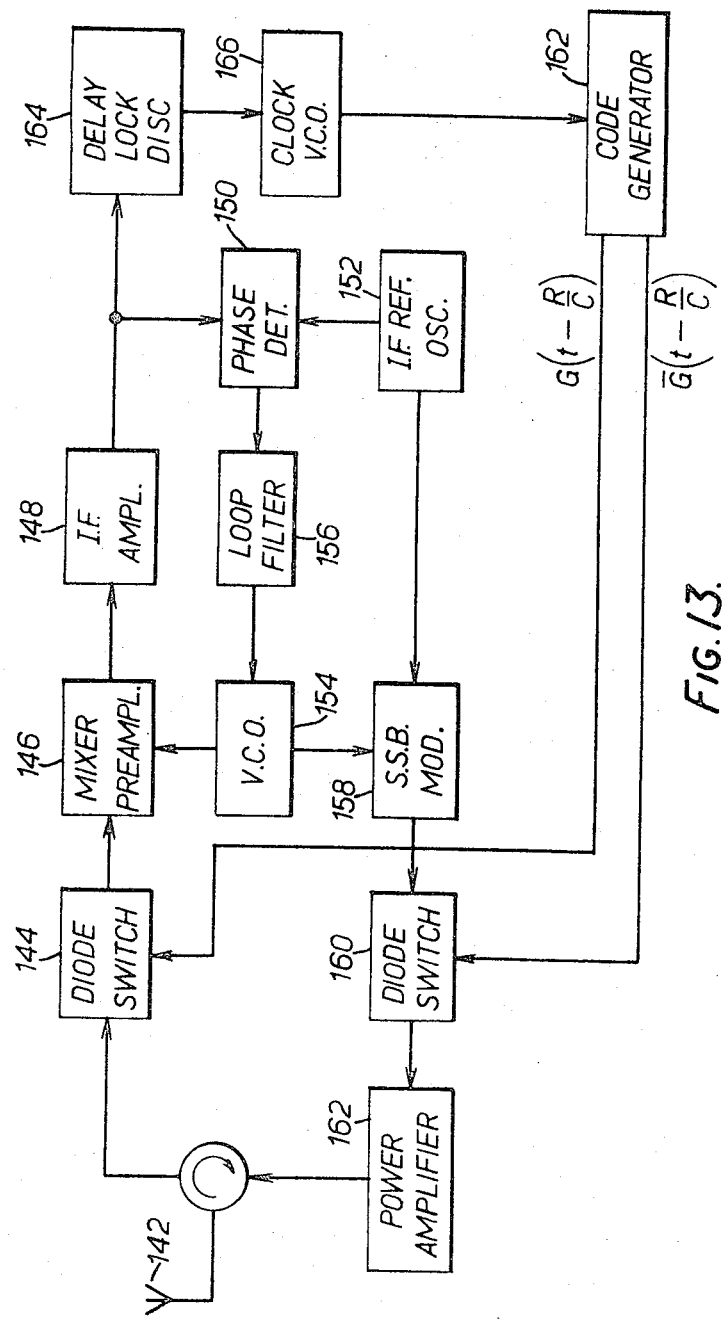
FIG. 13 is a block diagram of a transponder embodying the invention.

FIG. 13 shows a transponder for enabling aircraft and the like to determine their positions. An aircraft having a transmitter and receiver which are gated by a code generator similar to that shown in FIG. 5 can transmit an interrogate signal to the transponder. The transponder generates an output signal upon receipt of the interrogation signal. By detecting the output signal from the transponder the aircraft can determine its distance from the transponder.

The transponder includes an antenna 142, which is connected by a diode switch 144 to a receiver. The receiver includes a mixer-preamplifier 146 and an intermediate frequency (IF) amplifier 148. A phase detector 150 compares signals from an intermediate frequency reference oscillator 152 and the output of the amplifier 148 and controls a voltage controlled oscillator 154 through a loop filter 156. The output of the voltage controlled oscillator is fed simultaneously to the mixer-preamplifier 146 and a single side band modulator 158. The single side band modulator 150 is driven by the oscillator 152. The output of the modulator 158 is passed through a diode switch 160 and a power amplifier 162 to the antenna 142.

The diode switches 144 and 160 are controlled by a code generator 162 similar to the code generator in the aircraft.

The output of the receiver is also fed to a delay lock discriminator 164 which controls a voltage controlled clock pulse generator 166. The clock 166 triggers the code generator 162.

In operation, an interrogation signal is received by the antenna 142 gated by the diode switch 144, fed to the receiver and passed to the delay lock discriminator 164.

The delay lock discriminator 164 will control the voltage control oscillator clock 166 in such a sense as to tend to obtain a maximum output from the receiver. Thus if the receive gate pulses generated by the code generator are not in step with the gated interrogation signal the delay lock discriminator 164 adjusts the code generator 162 by means of the clock voltage controlled oscillator 166 until synchronism is achieved. The frequency of the receiver carrier signal is compared with the frequency of an IF oscillator by means of a phase detector 150. The phase detector then controls the voltage clock controlled oscillator 154 to supply the mixer pre-amplifier 146 with a frequency such as to tend to make the output frequency of the receiver equal to the frequency of the intermediate frequency reference oscillator 152. An output of the intermediate frequency reference oscillator is then modulated by the frequency of the voltage control oscillator 154 in single side band modulator 152 and passed through the diode switch 160 to the power amplifier 162 to be transmitted to the antenna 142. It will be thus appreciated that since the code generator 162 is synchronized with the gated interrogation signal and since the carrier wave output is synchronized also with the interrogation signal, a signal identical to the interrogation signal is transmitted to the aircraft after a known predetermined delay.

The techniques described above are applicable not only to radar augmentation but is also applicable to a large number of two-way signalling systems such as radio surveying (DME) and data link equipment thus eliminating the usual requirement for dual frequency allocation.

The described system thus permits virtually simultaneous two-way signalling on a common radio or sonic carrier with complete isolation between the transmitter and receiver while at the same time permitting the reception of the delayed signals with only 3 db signal loss.

As hereinbefore described, the system uses amplitude modulation and the radiated spectrum contains a strong carrier frequency component. For security reasons, it may be desirable to suppress the carrier to make detection more difficult. This may be accomplished by phase or frequency modulating the signal on a pulse to pulse or code to code basis. For example the carrier may be completely suppressed by reversing the carrier phase each code period. The carrier power will then be distributed among the side band frequencies.

From the foregoing, it will be seen that with the systems embodying the invention described herein, resolution and range can be varied independently by varying the gating frequency ($fg$) and the code length ($M$). This characteristic allows the system to be operated at a relatively low power (with consequent practical advantages in transmitter and receiver design) with only a 3 db system degredation. In a pulsed system, on the other hand, range can only be increased by decreasing the pulse repetition frequency with a consequent decrease in performance unless the peak power or pulse width is increased.

Many changes and modifications to the systems embodying the invention and described herein will be apparent to persons skilled in the art, and the invention encompasses all such changes and modifications which fall within the scope of the appended claims. In particular it is pointed out that although the systems embodying the invention and described herein use pseudo-random (maximum length) sequences, non maximum length codes or sequences having equivalent satisfactory autocorrelation functions could be used instead without departing from the scope of the invention.

I claim:

1. A data transmitting and receiving system, comprising data transmitting means operative when activated to transmit a signal, data receiving means operative when activated to receive a signal derived from the transmitted signal, and control means operatively connected to activate the transmitting and receiving means, the control means being operative to activate the transmitting means for each ON period of a sequence of ON and OFF periods, the relative lengths of the periods being predetermined and such that each part of the sequence measured from the beginning of the sequence differs from the next following part of equal length, the control means being operative to activate the receiving means during each said OFF period.

2. A system according to claim 1, including an antenna connected to the data transmitting and receiving means to radiate and receive said signal.

3. A system according to claim 2, wherein said control means comprises means for repetitively generating a pseudo-random binary code and means responsive to said binary code to produce a first group of pulses to control the ON and OFF periods of the data transmitting means and a second group of pulses to control the ON and OFF periods of the data receiving means.

4. A gated transmitter and receiver system comprising
an antenna,
a transmitter connected to transmit signals to said antenna,
a receiver connected to receive signals from said antenna,
first gating means for gating the signals from the transmitter to the antenna,
second gating means for gating the signals from the antenna to the receiver, and
code generating means for alternately operating said first and second gating means by means of, respectively, recurringly generated first and second pluralities of pulses, the pulses of said first and second pluralities of pulses being of such predetermined durations and recurring at such predetermined times that all signals transmitted by the antenna and sensed thereby upon reflection by a target will be registered by the receiver provided that the delay between transmission and reception of the signal does not exceed the duration of said first and said second plurality of pulses.

5. A search radar system, comprising
an antenna,
a transmitter connected to the antenna,
a receiver connected to the antenna,
a code generator connected to the transmitter and receiver to alternatively enable the transmitter and receiver by means of respective recurring groups of predetermined transmitter and receiver pulses, the pulses of the two groups being such that signals transmitted by the antenna and received by the antenna upon reflection within the duration of each group of pulses will be processed by the receiver,
a delay shift register connected to the code register for delaying the group of transmitter pulses,
a coincidence matrix connected to receive the outputs of the code generator and the delay shift register whereby to simulate receiver output signals for different discrete target ranges, and
comparison means for comparing the receiver output signal with the simulated output signals to determine between which pair of adjacent discrete target ranges the range represented by the receiver output signal lies.

6. A system according to claim 5 wherein said coincidence matrix comprises
a plurality of AND gates each having first and second inputs and an output, one input of each AND gate being connected to a corresponding output of the delay shift register and the other input of each AND gate being connected to receive said group of diode switch pulses,
a plurality of pairs of linear gates, each linear gate having first and second inputs and one output,
means interconnecting the first inputs of each pair of linear gates to the outputs of corresponding AND gates and connecting the second inputs of the linear gates to receive the output of the receiver,
difference means connected to the outputs of each pair of linear gates to provide an output signal representative of the difference in output signals from each pair of linear gates, and
a threshold circuit connected to the output of each difference means to pass the output signal from the difference means only when the amplitude of the output signal exceeds a predetermined value.

7. A radar tracking system comprising
an antenna,
a transmitter,
a receiver,
a code generator connected to the transmitter and receiver to recurringly connect the transmitter and receiver alternately to the antenna under the control of respective first and second groups of predetermined coded pulses, said first and second groups of coded pulses being such that the signals transmitted by the antenna and which return to the antenna within the duration period of each group of coded pulses can be received by the receiver to enable an unambiguous determination of the distance travelled by the transmitted signal.

8. A system according to claim 7, including a range tracker connected to the receiver and the code generator to receive said second group of coded pulses for determining the distance travelled by the transmitted signal.

9. A system according to claim 8, including a frequency tracker connected to the receiver and the range tracker to determine the doppler frequency imposed upon the transmitted signal on its journey to and from the antenna.

10. A system according to claim 7, including
a monopulse feed arrangement operable to cause the received signal to be modulated by an error signal representative of the attitude of the antenna relative to the direction in which a target to be tracked lies,
an error signal demodulator connected to the receiver to detect said error signal, and
antenna attitude servo control means connected to the error demodulator to control the attitude of the antenna in dependence upon the error signal.

11. A system according to claim 7, wherein said range tracker comprises
first, second and third linear gates each having first and second inputs and an output, the first output of each gate being connected to the receiver,
first and second difference means each having first and second inputs, the first input of each difference means being connected to the output of the second linear gate, and the second inputs of the first and second difference means being connected to the outputs of the first and third linear gates,
first and second threshold devices each having an input and an output, the inputs of the threshold devices being respectively connected to the outputs of the first and second difference means,
third difference means having first and second inputs and an output, said first and second input being respectively connected to the outputs of the first and second threshold devices,
a code generator similar to the first mentioned code generator, a controllable pulse generator for driving the code generator in dependence upon the output of said third difference means, first, second and third AND gates each having first and second inputs and an output, the first input of each AND gate being connected to receive said first group of coded pulses from said first mentioned code generator and the outputs of the AND gates being respectively connected to the second inputs of the first, second and third linear gates, and delay means interconnecting the second mentioned code generator with the second inputs of the AND gates whereby to delay the code generator output to the first, second and third AND gates respectively by $O$, $T$ and at least $2½T$ where $T$ is the period of the pulses generated by the controllable pulse generator.

* * * * *